(12) United States Patent
Birtwell et al.

(10) Patent No.: US 9,379,911 B2
(45) Date of Patent: Jun. 28, 2016

(54) MESSAGE STORAGE DEVICE AND A MOVING IMAGE MESSAGE PROCESSOR

(75) Inventors: Phillip Michael Birtwell, London (GB); Nicholas Ian Moss, Middlesex (GB)

(73) Assignee: StarLeaf Ltd., London (GB)

(*) Notice: Subject to any disclaimer, the term of this patent is extended or adjusted under 35 U.S.C. 154(b) by 575 days.

(21) Appl. No.: 13/473,801

(22) Filed: May 17, 2012

(65) Prior Publication Data

US 2012/0300915 A1 Nov. 29, 2012

Related U.S. Application Data

(60) Provisional application No. 61/488,203, filed on May 20, 2011.

(51) Int. Cl.
| | |
|---|---|
| H04M 11/00 | (2006.01) |
| H04L 12/58 | (2006.01) |
| H04N 7/14 | (2006.01) |
| H04M 3/53 | (2006.01) |

(52) U.S. Cl.
CPC ............. H04L 12/58 (2013.01); H04M 3/5315 (2013.01); H04N 7/147 (2013.01)

(58) Field of Classification Search
CPC .............. H04M 3/5307; H04M 2203/4527; H04M 3/533; H04M 1/72555; H04M 2250/52; H04L 12/5835; H04N 7/147; H04N 7/141
USPC ........... 379/88.14; 348/14.06; 455/413, 556.1
See application file for complete search history.

(56) References Cited

U.S. PATENT DOCUMENTS

| | | | |
|---|---|---|---|
| 5,510,899 A | 4/1996 | Kim | |
| 5,825,425 A | 10/1998 | Kazui et al. | |
| 5,896,165 A | 4/1999 | Rao | |
| 6,320,588 B1 * | 11/2001 | Palmer et al. | 345/473 |
| 7,477,282 B2 * | 1/2009 | Firestone et al. | 348/14.09 |
| 8,291,462 B2 * | 10/2012 | Lee et al. | 725/105 |
| 8,457,604 B2 * | 6/2013 | Pereira et al. | 455/414.1 |
| 8,515,029 B2 * | 8/2013 | Shaw | 379/88.14 |
| 8,537,983 B1 * | 9/2013 | Haggerty et al. | 379/88.14 |
| 2002/0025026 A1 * | 2/2002 | Gerszberg et al. | 379/67.1 |
| 2003/0227972 A1 | 12/2003 | Fukuda | |
| 2007/0053346 A1 | 3/2007 | Bettis et al. | |
| 2007/0058681 A1 | 3/2007 | Bettis et al. | |
| 2008/0291265 A1 * | 11/2008 | Wagner | H04N 7/152 348/14.16 |
| 2010/0103245 A1 * | 4/2010 | Decker et al. | 348/14.09 |

(Continued)

FOREIGN PATENT DOCUMENTS

| | | |
|---|---|---|
| EP | 1113631 | 7/2001 |
| WO | WO 2012/017260 | 2/2012 |

*Primary Examiner* — Simon King
(74) *Attorney, Agent, or Firm* — Occhiuti & Rohlicek LLP

(57) ABSTRACT

A message storage device 114 configured to store users' messages electronically. The message storage device 114 is configured to interact with a user's electronic device 100,101, 104,105,108,110,113 for transmitting a message to and/or receiving a message from the storage device in a manner dependent on the functionality of the user's electronic device 100,101,104,105,108,110,113. Also described is a moving image message processor in which an input moving image message stream including at least one first key frame is processed to include second key frames at a predefined time interval apart. Also described is a message storage device 114 including a controller configured to control movement of encoded video messages to and from a store and a processor depending on at least one predefined condition.

29 Claims, 4 Drawing Sheets

(56) References Cited

U.S. PATENT DOCUMENTS

| | | |
|---|---|---|
| 2010/0159890 A1* | 6/2010 | Sigmund et al. .............. 455/413 |
| 2010/0217816 A1 | 8/2010 | Smelyansky |
| 2010/0262667 A1 | 10/2010 | Briand et al. |
| 2010/0322310 A1 | 12/2010 | Deng et al. |
| 2011/0085016 A1* | 4/2011 | Kristiansen et al. ........ 348/14.03 |
| 2013/0095799 A1* | 4/2013 | Shaffer et al. ................. 455/413 |

* cited by examiner

MESSAGE STORAGE DEVICE AND A MOVING IMAGE MESSAGE PROCESSOR

CROSS-REFERENCE TO RELATED APPLICATIONS

This application claims priority to U.S. patent application Ser. No. 61/488,203, titled "A MESSAGE STORAGE DEVICE AND A MOVING IMAGE MESSAGE PROCESSOR", filed on May 20, 2011, the contents of which are incorporated herein by reference. This application is also related to U.S. patent application Ser. No. 61/488,197, titled "A MOVING PICTURE COMMUNICATION SYSTEM" filed on May 20, 2011, the contents of which are incorporated herein by reference.

BACKGROUND OF THE INVENTION

The present invention relates to a message storage device and a moving image message processor.

Described embodiments relate to a method and system for providing a video-enabled enhancement of audio voicemail features to users of videotelephony networks in an enterprise environment, particularly in large enterprises with 5000 or more people.

Electronic voice communications today are carried out by a great variety and range of devices, such as traditional landline or fixed-line telephones and mobile phones as well as smartphones. Today, land-line telephones mainly have a dual-tone multi-frequency signalling (DTMF) or Touch-tone keypads including numeral keys 0 to 9 as well as a "*" key and a "#" key together with, in enterprise environments, some extra function keys to, for example, transfer calls, put a caller on hold or access voicemail. Mobile telephones typically also have DTMF keypads, but also some other function keys which vary in number and function from manufacturer to manufacturer and model to model. Some of these function keys may be user definable. Smartphones, on the other hand, typically have a touch-screen which defines keys whose number and function may be varied and defined both by a user, an app or application running on the smartphone or from an external input. A DTMF keypad may be defined as well as other arrangements.

Recently, real-time video communications (also including voice) have become more wide spread and may be carried out using a great variety of devices including smartphones, typically using proprietary video networks such as Apple Facetime (registered trade mark) or Skype (registered trade mark) (both also useable using a standard desktop or laptop personal computer), as well as fixed-line systems often seen in enterprise environments such as (1) "all-in-one" personal video-conferencing telephones or video-enabled Internet protocol (IP) telephones, such as the Tandberg T150, that look much like a conventional fixed-line phone with the addition of a camera; (2) videoconferencing room systems or Integrated Services Digital Network (ISDN) videoconferencing devices, such as the Tandberg Telepresence T3; and (3) IP videoconferencing endpoints or software plug-ins for general-purpose computers connected to voice-only telephones, such as the Cisco VT Advantage. All of these devices have different functionality and capabilities, including different user interfaces and different screen sizes, resolutions and configurations.

A "video-voicemail" system is an arrangement in which a caller calling another person's device (the callee) is provided with a recorded message if the callee is not available typically along the lines of, "This is Bob's phone. Please leave a message after the tone". The caller is provided with the ability to record a message for the callee such as "Please call me when you are free". In a video-voicemail environment, these messages may include video, such as of the caller or callee speaking, as well as audio.

As a result of the great variation in accessing devices described above, compatibility of enterprise "video-voicemail" systems for video and audio calls has been problematic and a reliable service has not been available. This is one reason why such systems have not become widely accepted.

Known video/voicemail systems are typically tied to one specific video network such as Apple Facetime (registered trade mark), and are little more than a video equivalent of an answerphone where the caller can leave a message and the callee can retrieve it.

Advanced features (for example, folders, group mailboxes, message forwarding, and message multicast and broadcast) found in voice-only enterprise-class voicemail systems are not found in known video/voicemail systems.

Embodiments of the invention described herein address these problems of lack of cross-video-network compatibility and features to provide a video/voicemail system that may be used with great variation in the functionality of accessing devices or endpoints.

Video data for video/voicemail systems requires large amounts of electronic data and thus it is compressed both for storage (to reduce the storage space required to manageable levels) and transmission (to reduce bit rates required to manageable levels).

There are differences in functionality between video endpoints. For example, there may be differences in video compression protocols that they can handle, and differences in permitted image sizes. Embodiments of the invention described herein provide a video/voicemail system to handle these differences effectively and efficiently.

Another reason why video-voicemail systems have not been widely accepted is usability.

In audio-only voicemail systems, audio data is typically stored uncompressed because little electronic data needs to be stored to represent the voicemail and it can be transmitted at a low bitrate. During playback of audio-only voicemail messages, users have become used to precisely being able to fast forward or rewind the message to, for example, listen again to a telephone number that has been said. As voicemail data is typically uncompressed, this is simple to implement.

In contrast, for video systems, as mentioned above, video data requires relatively large amounts of electronic data and thus it is compressed both for storage and transmission. The compression of the data is generally optimised to minimise bit rate and latency. For example using the H.264 format, greatly simplified, compression is done by sending a starting frame (key frame or intra frame) including a full image and subsequent difference frames which describe how parts of the image have changed since previous frames. In other words, the key frames are decodeable independently of other image frames while subsequent frames are decodeable dependent on other frames. Keyframes require relatively large amounts of storage space and bandwidth or bit rate compared to difference frames. Thus to reduce these requirements, the number of key frames is minimised. In a broadcast video system such as digital TV, key frames are sent at regular short intervals so that, for example, when someone changes to a new channel a TV will only after a short delay receive a key frame and will therefore be able to start displaying video. However, in a videoconferencing network the receiver is able to send messages to the transmitter. This enables the receiver to request that the transmitter send a key frame. Thus, the video network is able to avoid sending key frames at all unless they are actually needed, allowing the bit rate to be kept low.

A video stream stored in a voicemail system using a file formatted in this way may be readily played from start to finish. However, users require to fast forward and rewind video messages or, in other words, seek to a point in the video stream and the methodology described above of storing and transmitting video data means that this is not possible in a way that provides a good user experience. This is because a required image at a particular point in time is likely to be represented only by a difference frame. Thus, to display the image represented at this point in time the other frames required to decode the difference frame must be sought and themselves decoded. This is a time consuming process and leads to jerky and/or slow "fast" forwarding or rewinding giving a very poor user experience. Embodiments of the invention described herein address this problem to effectively provide a good user experience and smooth fast forwarding and rewinding of video in voice/video mails.

BRIEF SUMMARY OF THE INVENTION

The invention in its various aspects is defined in the independent claims below to which reference should now be made. Advantageous features are set forth in the dependent claims.

Arrangements are described in more detail below and take the form of a message storage device configured to store users' messages electronically. The message storage device is configured to interact with a user's electronic device for transmitting a message to and/or receiving a message from the storage device in a manner dependent on the functionality of the user's electronic device. Also described is a moving image message processor in which an input moving image message stream including at least one first key frame is processed to include second key frames at a predefined time interval apart. Also described is a message storage device including a controller configured to control movement of encoded video messages to and from a store and a processor depending on at least one predefined condition.

Embodiments described provide compatibility to users of video telephony equipment to that previously only enjoyed by audio telephony equipment users, and furthermore greatly enhances that functionality with features appropriate to devices with video capabilities.

In a first aspect of the present invention, there is provided a message storage device configured to store users' messages, the message storage device being configured to interact with a user's electronic device for transmitting a message to and/or receiving a message from the storage device in a manner dependent on the functionality of the user's electronic device.

This arrangement provides a video/voicemail system that may be used with great variation in the functionality of accessing devices or endpoints.

The message storage device may store messages comprising audio and video. It may interact with a user's electronic device in a manner dependent on the user's electronic device comprising: a telephone for transmitting and receiving audio-only messages, or a videophone for transmitting and receiving audio and video messages. If the former, the message storage device may interact with a user's electronic device such that only audio of a message stored as video and audio is transmitted to the telephone.

The message storage device may interact with a user's electronic device in a manner dependent on the user's electronic device comprising a display configurable by the message storage device, and/or on the display being a touch sensitive display.

In another aspect of the present invention, there is provided a method for a message storage device configured to store users' messages interacting with a user's electronic device for transmitting a message to and/or receiving a message from the message storage device, the method comprising: the message storage device interacting with the user's electronic device in a manner dependent on the functionality of the user's electronic device.

In another aspect of the present invention, there is provided a moving image message processor configured to process an input moving image message stream into a processed moving image message stream, the input moving image message stream comprising a first plurality of image frames comprising: at least one first key frame, the or each first key frame comprising a representation of an image decodeable independently of other image frames of the first plurality of image frames; and first frames decodeable dependent on other image frames of the first plurality of image frames; and the processed moving picture message stream comprising: second key frames at a predefined time interval apart, each of the second key frames comprising a representation of an image decodeable independently of other image frames of the second plurality of image frames; and second frames between second key frames decodeable dependent on other image frames of the second plurality of image frames.

This arrangement effectively provides a good user experience by providing the facility for smooth fast forwarding and rewinding of video in voice/video mails.

The input moving image message stream may comprise a plurality of first key frames each a different first key frame time interval apart. The different first key frame time intervals may be unpredictable. The predefined time interval between all key frames may be predictable. The predefined time interval may be limited by at least one predefined constraint.

Key frames of the processed moving picture message stream may each comprise an identifying mark. The moving picture message processor may comprise a generator configured to generate a key frame index comprising an indication of the location of key frames in the processed moving picture message stream. These arrangements provide the facility for quick and accurate fast forwarding and rewinding of video in voice/video mails.

In another aspect of the present invention, there is provided a method of processing an input moving image message stream into a processed moving image message stream, the method comprising: inputting an input moving image message stream comprising a first plurality of image frames comprising: at least one first key frame, the or each first key frame comprising a representation of an image decodeable independently of other image frames of the first plurality of image frames; and first frames decodeable dependent on other image frames of the first plurality of image frames; and processing the input moving image stream into a processed moving picture message stream comprising: second key frames at a predefined time interval apart, each of the second key frames comprising a representation of an image decodeable independently of other image frames of the second plurality of image frames; and second frames between second key frames decodeable dependent on other image frames of the second plurality of image frames.

In a further aspect of the present invention, there is provided a message storage device for storing video messages received at the message storage device electronically, the message storage device comprising: a store for storing encoded video messages; a processor for processing encoded video messages; and a controller configured to control movement of encoded video messages to and from the store and the processor depending on at least one predefined condition.

This arrangement allows a video/voicemail system to handle differences in, for example, screen resolution and video compression protocols in different video-enabled endpoints effectively and efficiently.

The at least one predefined condition may comprise processing load of the processor, spare storage capacity of the store, the time, capability of a device used to transmit the encoded video message to the message storage device, and/or the size of an encoded video message and/or being based on a feature of a recipient of an encoded video message (the feature may comprise the location of the recipient of an encoded video message) and/or the age of an encoded video message and/or being based on the frequency at which a recipient of an encoded video message has previously accessed the encoded video message and/or at least one capability of at least one device expected to retrieve the encoded video message from the message storage device (this is because the recipient of a message may have used one or more devices to have accessed the message storage device) and/or the history of the video playback capabilities of devices used in past access of the message retrieval system by the recipient.

The processor may be configured to encode video messages at a plurality of resolutions and/or using a plurality of compression protocols.

In another aspect of the present invention, there is provided a method of electronically storing video messages received at a message storage device in the message storage device, the method comprising: controlling movement of encoded video messages to and from a store for storing encoded messages of the message storage device and a processor for processing encoded video messages of the message storage device depending on at least one predefined condition.

BRIEF DESCRIPTION OF THE DRAWINGS

The invention will be described in more detail, by way of example, with reference to the accompanying drawings, in which.

DETAILED DESCRIPTION OF THE INVENTION

An example message storage device or video/voice mail system will now be described with reference to FIGS. 1 to 4.

Figure 1:
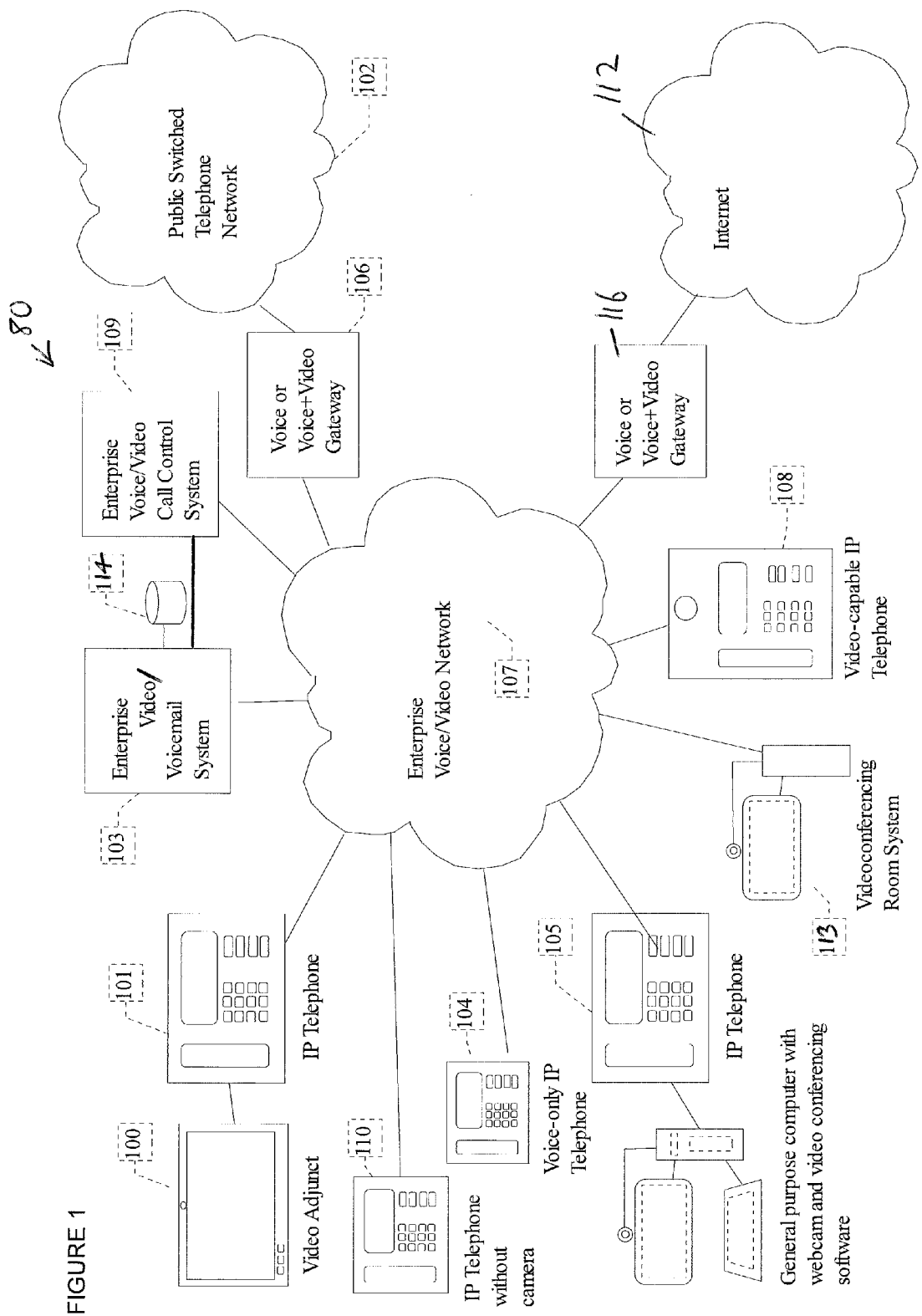
FIG. 1 is a schematic view of a video communications network including a message storage device embodying an aspect of the present invention.

A communications system 80 including an enterprise network 107 for voice/video communications is illustrated in FIG. 1. The network is connected to the external video communications network, via voice or voice and video gateway 106,116 using a standard protocol such as H.323 or session initiation protocol (SIP) for Internet transmission 112 (or a proprietary protocol) or via the public switched telephone network 102.

A variety of users' electronic devices or endpoints 100, 101,104,105,108,110,113 with different functionality are connected to the network 107. These users' devices include an IP telephone 101 including a video adjunct 100 (described in the US patent application concurrently filed with the present application with the title "A MOVING PICTURE COMMUNICATION SYSTEM" incorporated herein by reference as referred to above), an IP telephone 110 without a camera and with a high resolution colour LCD display, a voice-only IP telephone 104, a voice only IP telephone linked with a general-purpose computer with an appropriate software plug-in for video calling 105, a videoconferencing room system 113, and a video-capable IP telephone 108, that is to say an IP telephone with a camera and a high resolution colour LCD display.

A call control system 109 and a video/voicemail system or message storage device 103 are also connected to the network 107. The video/voicemail system 103 is connected to storage subsystems 114 capable of keeping or storing messages comprising audio and video (video is stored in a compressed format), or audio only. The video/voicemail system 103 also has associated software and protocols for communicating with the video communications network 107, and endpoints or user devices 100,101,104,105,108,110,113.

The video/voicemail system or message storage device 103 is configured to store users' messages electronically on storage sub-system 114. This storage subsystem may for example be a locally attached disk or array of disks, or a storage area network (SAN) or a network file system. The video/voicemail system is configured to interact with a user's electronic device or endpoint 100,101,104,105,108,110,113 for transmitting a message to and/or receiving a message from the storage device in a manner dependent on the functionality of the user's electronic device.

The video/voicemail system 103 is connected to the call control system 109. The nature of this connection depends on the type and extensibility of the call control system. It may use either extensions to standard protocols such as H.323 or SIP or may augment the standard protocol connection with a proprietary additional protocol.

The system 103 may be loosely coupled to an existing standards-based call control mechanism using standard protocols such as H.323 or SIP. In this configuration, existing user-generated signalling mechanisms such as DTMF signalling (using standard telephone keys, namely numerals 0 to 9 as well as "★" and "#") or the standardized Far-End Camera Control (FECC) videoconferencing protocol (allowing the user to send left/right/up/down/focus messages to the far end of a call) are used to allow control of the video/voicemail system or server by a user. Alternatively, a proprietary protocol is used for communications between the video/voicemail system rather than a standard protocol to provide tight coupling between the call control system 109, the endpoints 100,101,104,105,108,110,113 and the video/voicemail system 103 to allow the video/voicemail system to interact with an endpoint dependent on the endpoint's functionality. In this configuration, more advanced signalling mechanisms may be deployed which allow the video/voicemail system better control over the endpoint and thus provide the user with a more intuitive user interface such as a touch-screen graphical user interface (GUI) with which to control the video/voicemail system or server.

Using the latter configuration, by way of example, the video/voicemail system 103 interacts with an endpoint 100, 101,104,105,108,110,113 depending on the endpoint being a telephone 104 for transmitting and receiving audio-only messages, or a videophone 100,101,105,108,109 for transmitting and receiving audio and video messages. If the endpoint is a telephone 104 for transmitting and receiving audio-only messages and a message has been stored as audio and video only the audio is transmitted to the telephone. If the endpoint has a display configurable by the message storage device, such as a touch sensitive display or touch-screen, then the video/voicemail system may transmit data for configuring the display, such as to display and provide functionality to buttons for controlling the video/voicemail system such as buttons to fast forward or rewind a video/voicemail message. The video/voicemail system may also interact with an endpoint depending on the screen quality of the endpoint, such as its size, resolution, configuration, aspect ratio, or range of displayable colours as well as the video image formats it can handle.

Call Flows

When a caller places a call to a callee the protocol (H.323 or SIP or another standard or proprietary protocol) enables the caller to request certain media channels (audio and or video), to declare capabilities for decoding different types of media or combinations thereof and to recommend preferences for the types of channels to be opened. If the callee diverts the call to the video/voicemail system then the video/voicemail system will receive this information and can use it to determine what media types are recorded and what video formats, if any, are used. In other words, the functionality of the user's electronic device is ascertained through information received at the video/voicemail system or message storage device from the user's electronic device. The functionality may be obtained directly from the information or by inference from the information.

By way of example, there are several possible procedural flows for the system including the following, which reflect the video/voicemail system interacting with an end point dependent on the functionality of the endpoint.

Internal Call from Tightly Integrated Video Phone

This example describes the call flow from an IP telephone 101. This is a device which is tightly integrated with the call control system 109, in this example using a proprietary protocol, and therefore allows the call control system and the voicemail system to control the telephone's user interface (for example the display and "soft" (user-definable) keys). By virtue of the device being tightly integrated, the voicemail system may ask the phone for information about its capabilities and can adjust aspects of the media, such as choice of codecs and image resolution, to suit. In other words, the functionality of the user's electronic device is ascertained directly through information received at the video/voicemail system.

A caller using device IP telephone 101 places a call to a callee having a video capable IP telephone 108. The callee either ignores the call or chooses to divert the call to video/voicemail by pressing a key on their telephone or the call is diverted by policy. The call is then transferred to video/voicemail system 103. The video/voicemail system plays a pre-recorded video of the called person on the caller's telephone asking the caller to leave a message. The caller is then guided through the process of leaving a message using on-screen menus and prompts on their IP telephone. The caller can select options using the touch-screen on their telephone 101. The caller may also be given other on-screen options such as redirecting the call, for example to the callee's personal assistant (PA) or manager, or re-recording the message. Once a message has been left by the caller, an indication is given on the callee's telephone 108 to indicate that a message is waiting for them, such as a lamp being lit.

Call from Loosely Integrated Video Phone

This example describes the call flow from a standards based video endpoint. This is the most likely call flow for users of H.320 ISDN video endpoints calling into a company via the gateway 106 from the external public switched telephone network 102, or for users of H.323 video endpoints calling into a company via the gateway 116 from the Internet 112.

Figure 2:
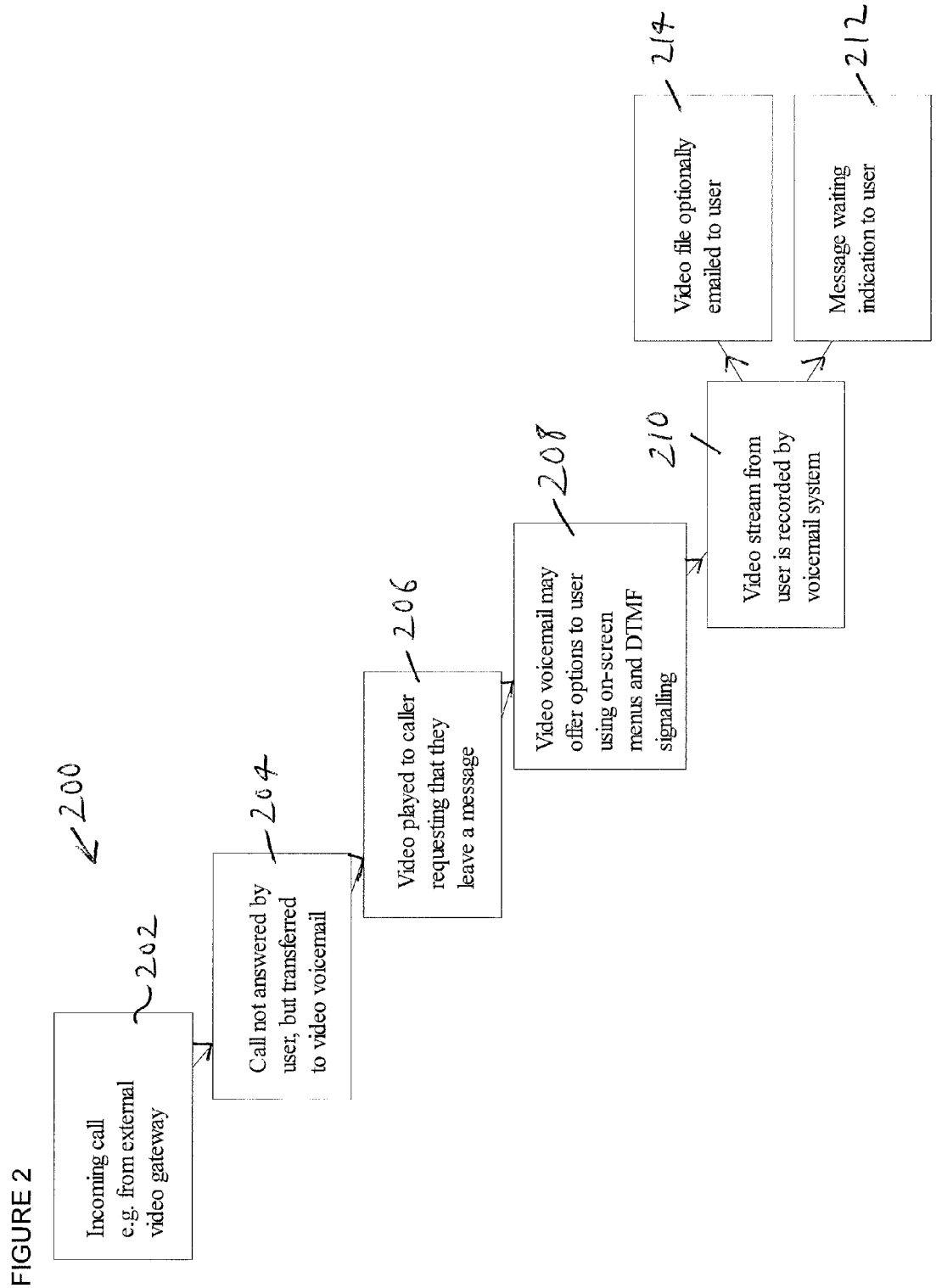
FIG. 2 is a flow diagram of call flow for a user using an endpoint to leave a message in the message storage device of FIG. 1 embodying an aspect of the present invention.

The call flow from the two types of gateway 106 or 116 are similar and they are illustrated in the flow diagram in FIG 2.

Using a standards-based video capable IP telephone, a caller places a call to a callee who has a video-capable IP telephone, via an external voice and video gateway 106 or 116 (reference 202). During call setup, the calling standards-based endpoint will send a list of its capabilities. In other words, the functionality of the user's electronic device is ascertained directly through information received at the video/voicemail system. The list includes types of video and audio codecs, available image resolutions and permitted combinations thereof. The callee either ignores the call or chooses to divert the call to voicemail by pressing a key, or the call is diverted by policy. The call is then transferred to the video/voicemail system 204. The information about the caller's device capabilities are either retransmitted by the caller's endpoint during the call transfer process, or they are kept by the call control system and passed to the video/voicemail system during the call transfer process. This allows the video/voicemail system to know the capabilities of the caller's endpoint and to adjust the video recording codec parameters accordingly.

The video/voicemail system then plays a pre-recorded video (including audio) of the called person asking the caller to leave a message 206. The caller is then guided through the process of leaving a message using on-screen menus and prompts. The caller may select options using the DTMF keys on their telephone. The video/voicemail system may also allow the user to control the process of leaving messages using the far end camera control protocol (FECC) found as part of the video calling standard (e.g. H.323 or SIP).

The caller may also be given other on-screen options such as redirecting the call, for example to the callee's PA or manager, or re-recording the message. A video of the caller (including audio) is streamed to the video/voicemail system and recorded by the video/voicemail system 210. Once a message has been left by the caller, the message storage device or video/voicemail system transmits to the user's electronic device or telephone an indication that a message has been received. In response, an indication is given on the callee's telephone to indicate that a message is waiting for them, such as a lamp being lit 212. Optionally, an electronic video file (including audio) may be sent by e-mail to the callee 214.

Call from Audio-Only Phone

This example describes the call flow from a traditional audio-only telephone. This may be an internal telephone 104. This is also the most likely call flow for users of conventional telephones calling into a company via the gateway 106 from the external public switched telephone network 102, or for organisations using audio-only Internet Telephony calling into a company via the gateway 116 from the Internet 112. If a user calls in from the PSTN, the gateway 106 will know that the caller is on a voice-only device because of the telephony signaling used or because of the physical connection that the gateway has. This information is passed to the call control system 109. If a user calls in from the Internet or from an internal telephone 104, the call setup information contains only voice capabilities, so the call control system 109 will know that it is a voice-only call. From this point onward, the call flow from the two types of gateway 106 or 116 or from an internal telephone 104 are similar.

Referring back to FIG. 1, a caller using a voice-only (audio-only) IP telephone 104 places a call to a callee who has a video-capable IP telephone 108. The callee either ignores the call or chooses to divert the call to voicemail by pressing a key or the call is diverted by policy. The call is then transferred to video/voicemail system 103. The video/voicemail system plays either the audio from a pre-recorded video or a separate audio recording of the called person asking the caller to leave a message. The caller is then guided through the process of leaving a message using voice prompts. The caller may select options using the DTMF keys on their telephone. The caller may also be given other spoken options such as redirecting the call to the callee's PA or manager, or re-recording the message. Once a message has been left by the caller, the message storage device or video/voicemail system transmits to the user's electronic device or telephone an indication that a message has been received. In response, an indication is given on the callee's telephone to indicate that a message is waiting for them, such as a lamp being lit 212.

Message Retrieval from Tightly Integrated Video Phone

A caller using a video-capable IP telephone 108 dials in to video/voicemail system 103.

Video/voicemail system offers an interactive graphical user interface (GUI) to the user on the touch-screen of their telephone 108. The GUI provides access to new messages, saved messages and the folder hierarchy. It also provides access for configuration of the behaviour of the video/voicemail system for example with regard to handling of incoming messages. The caller selects a message using a touch-screen on their telephone. The video/voicemail system plays the video and audio of the selected message. The telephone 108 provides graphical means for instructing the video/voicemail system to seek within a message during playback. Telephone 108 provides graphical means for instructing the video/voicemail system 103 to forward the message to other mailboxes. The GUI for forwarding a message may include integration with enterprise or local directory systems such as LDAP.

Message Retrieval from Tightly Integrated Touchscreen Phone without Camera

A caller using an IP telephone 110 that does not have a camera dials in to video/voicemail system 103. Video voicemail system 103 offers an interactive GUI to the user on the touch-screen of their telephone 110. The GUI provides access to new messages, saved messages and the folder hierarchy. It also provides access for configuration of the behaviour of the video/voicemail system for example with regard to the handling of incoming messages. The caller selects a message using a touch-screen on their telephone 110. The video/voicemail system plays video and audio of the selected message. The telephone 110 provides graphical means for instructing the video voicemail system to seek within a message during playback, for example, using a slider on a touch-screen display. The telephone 110 provides graphical means for instructing the video/voicemail system to forward the message to other mailboxes. The GUI for forwarding a message may include integration with enterprise or local directory systems such as LDAP.

Message Retrieval from Loosely Integrated Video Phone

A caller using a videoconferencing room system 113 dials in to video/voicemail system 103. The video/voicemail system 103 offers a GUI to the user on the screen of their videoconferencing system. The caller controls the video/voicemail system by selecting displayed options using DTMF keys or using voice recognition. The system may also allow control of the GUI using far-end camera control (FECC) messages from a standards-based video endpoint. A GUI provides access to new messages, saved messages and the folder hierarchy. It also provides access for configuration of the behaviour of the video/voicemail system for example with regard to handling of incoming messages. The caller selects a message using DTMF keys or voice recognition or FECC. The video/voicemail system plays video and audio of the selected message. The videoconferencing system provides means for instructing the video/voicemail system to seek within a message during playback using DTMF keys or voice recognition or FECC. The videoconferencing system provides means for instructing the video/voicemail system to forward the message to other mailboxes. The GUI for forwarding a message may include integration with enterprise or local directory systems such as LDAP. However, selection of options is performed using the DTMF keys or voice recognition or FECC Message Retrieval from Audio-Only Phone A caller dials in to video voicemail system 103 using a voice-only (audio-only) IP telephone 104. The video/voicemail system offers voice prompts to guide the user to their message.

The caller controls the video/voicemail system by using the DTMF keys on the telephone or using voice recognition. Voice prompts provide access to new messages, saved messages and the folder hierarchy. They also provide access (or configuration of the behaviour of the voicemail system for example with regard to handling of incoming messages. The caller selects a message using DTMF keys or voice recognition. The video/voicemail system plays audio of selected message. The telephone 104 provides means for instructing the video/voicemail system to seek within a message during playback using DTMF keys or voice recognition. The telephone 104 provides voice prompts for instructing the video/voicemail system to forward the message to other mailboxes.

Message Posting from Tightly Integrated Video Phone

A caller dials in to video/voicemail system 103 using an IP telephone 101 that includes a video adjunct 100 as described above. The message storage device or video/voicemail system is configured to be controlled by a user. In this example, this is by the video/voicemail system offering an interactive GUI to the caller on the touch-screen of their telephone 101. The GUI provides an option to record a message. The caller records a video message (including audio). The GUI provides an option to choose or select recipients from a corporate or a personal directory using a touch-screen of the IP telephone. The video/voicemail system posts the video message (including audio) to electronic mailboxes of the recipients that have been selected.

Message Posting from Loosely Integrated Video Phone

A caller dials in to video voicemail system 103 from a video conferencing room system 109.

The video/voicemail system 103 is configured to be controlled by a user and, in this example it offers ;in interactive GUI to the user on the screen of the video conferencing room system. The GUI provides an option to record a message. The caller may select this option using a DTMF keypad of the video conferencing room system or voice recognition or FECC. The caller then records video message (including audio). The GUI provides an option to choose or select recipients from a corporate or personal directory. The caller uses DTMF or voice recognition or FECC on the video conferencing system to select recipients. The video/voicemail system posts the video message (including audio) to the electronic mailboxes of the recipients that have been selected.

Message Posting from Audio-Only Phone

A caller dials in lo video/voicemail system 103 using a voice-only (audio-only) IP telephone 104. The video/voicemail system 103 offers voice prompts to the caller including an option lo record a message. The caller selects options using DTMF or voice recognition. The caller records an audio-only message. The caller chooses recipients using DTMF keys or tones to select a list of mailbox numbers or uses voice recognition to select recipients. The video/ voicemail system then posts the audio message to the electronic mailboxes of the selected recipients.

Alternative Message Retrieval Mechanisms

A video/ voicemail may not be limited to access via a traditional or tightly-integrated video endpoint as described above. Alternative mechanisms for retrieving messages and managing a mailbox may be via a web browser, or via an app or application on a mobile smart phone, or via an app or application on an IP telephone.

Multiple Resolution Video Storage

As described above, different video endpoints being used to fetch waiting video/ voice mail messages have different capabilities, for example, they may have different screen resolutions and may be able to handle different compression protocols. The arrangement described below allows the video/ voicemail system to transcode video lo make it compatible with requesting endpoints. Transcoding requires a video processing resource which is a limited real-time resource. That is to say, it takes a lot of processing lime, which may not be available if the video/voicemail system is in heavy use. Furthermore, once video has been transcoded it must be stored and this requires storage space or memory which is also a limiled resource. The arrangement described below provides a trade-off between these limited resources for this transcoding.

Figure 3:
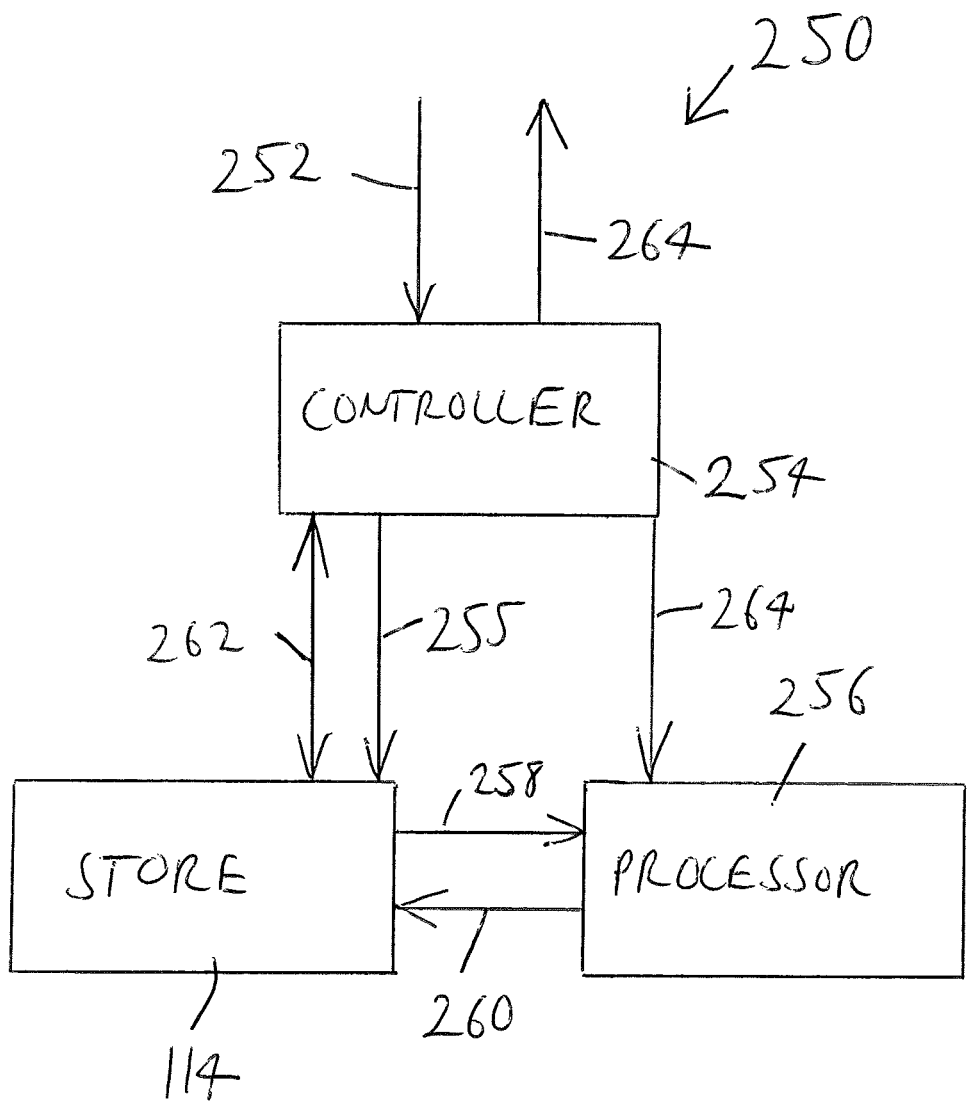
FIG. 3 is a schematic diagram of part of the message storage device of FIG. 1 embodying an aspect of the present invention.

The arrangement 250 illustrated in Figure 3 is part of a video/ voicemail system 103 (shown in Figure 1) that uses knowledge of the processing loads and available resources at different times (times of day) and knowledge of the typical devices used to fetch video messages from different mailboxes lo manage this trade-off. Some of the time it iranscodes messages offline (that is to say. when no request is made for the message) when there is spare processing load and spare storage space, such as disk space, and sometimes it transcodes messages on demand when a message is requested from an end point.

Turning to Figure 3. received video/ voice mail messages 252 in an encoded form enters the arrangement 250. forming part of the message storage device or video/ voicemail system, via a controller 254. The controller is in communication connection with the store 114 of the video/ voice mail system via communication connection 255 and with a processor 256 via communication connection 264. The store stores encoded video messages. The processor processes encoded video messages. The controller is configured, by sending appropriate signals via its communication connection 255, to control movement of the encoded video messages to and from the store 114 and the processor 256 depending on at least one predefined condition. Encoded video messages pass from the store to the processor via a connection 258 and from the processor to the store via a connection 260. Encoded messages pass between the controller and the store via a connection 262. Encoded messages pass from the controller to the processor via a connection 264. Encoded messages are transmitted from the controller to the enterprise voice/ video network 107 (see Figure 1) via the connection 264. The processor is configured to encode video messages at a plurality of resolutions and/or using a plurality of compression protocols.

A predefined condition by which messages pass to and from the store and processor may include one or more of the following: processing load of the processor, spare storage capacity of the store, the time (the time of day), capability of a device or end point used to transmit an encoded video message to the message storage device, policies based on location or other classification of the mailbox owner, the age of the message, the frequency at which an particular message is retrieved, historical experience of capabilities of the devices usually used to retrieve messages by the mailbox owner, and the size of an encoded video message.

In use. the controller 254 receives an encoded video/ voicemail message via connection 252 from an endpoint. The controller then assesses available capacity of the store and processor, the current time, and the size of the received message and routes the message either to the store 114 via connection 262 or to the processor 256 via connection 264. If routed to the processor, the processor processes the message into other encoded formats for example different resolutions as described above. These processed versions of the message are transmitted to the store 114 via connection 260. If a message received at the controller 254 is first routed to the store, the store stores the received message until signalled by the controller via connection 255 to transmit the encoded message to the processor, which it does via connection 258. The encoded message may be transmitted to the processor under predetermined conditions or for reasons set-out above, such as if the processor has spare capacity. Once received at the processor, the processor processes the message into other encoded formats, for example different resolutions, as described above. These processed versions of the message are transmitted to the store via connection 260.

An endpoint requests a message by sending a signal to the controller. In turn, the controller sends a signal to the store 114 via connection 255. If the message is stored in an appropriate format for the endpoint, then the message is transmitted via connection 262 to the controller and then output via connection 264 to the endpoint. If the message is not stored in the store in an appropriate format, then the message is transmitted via connection 260 to the processor, where it is processed into the correct format and then sent to the store via connection 260. Then, the message is transmitted via connection 262 to the controller and then output via connection 264 to the endpoint.

Video Storage

As discussed in the background to the invention section above, video for the video part of a video/ voicemail system is typically compressed. This is done by sending a starting frame (key frame, image frame or intra frame) including a full image and subsequent difference frames which describe how parts of (he image have changed since previous frames. In other words, the key frames are decodeable independently of other image frames while subsequent frames are decodeable dependent on other frames. The interval between key frames is variable and unpredictable. While allowing video data to be transmitted at low bit rate, this compression methodology does not allow users to smoothly and readily seek to a point in the video stream in a way that provides a good user experience.

The arrangement described below addresses this problem

In brief, the arrangement recodes the video stream of the video/ voicemail system to insert key frames at regular and more frequent intervals to which it is received from the endpoint or. in other words, selecting predefined time intervals between key frames as less than a predefined level. In one example, the key frames in the recoded video file are marked or given an indication to allow particular key frames to be readily identified or found. In another example, a key frame index is generated to allow particular key frames to be readily identified or found.

The enterprise video/voicemail system 103 of Figure 1 includes a moving image message processor 306 (see Figure 4) configured to process an input moving image message stream or video message from an endpoint into a processed moving image message stream or processed video stream.

Figure 4:
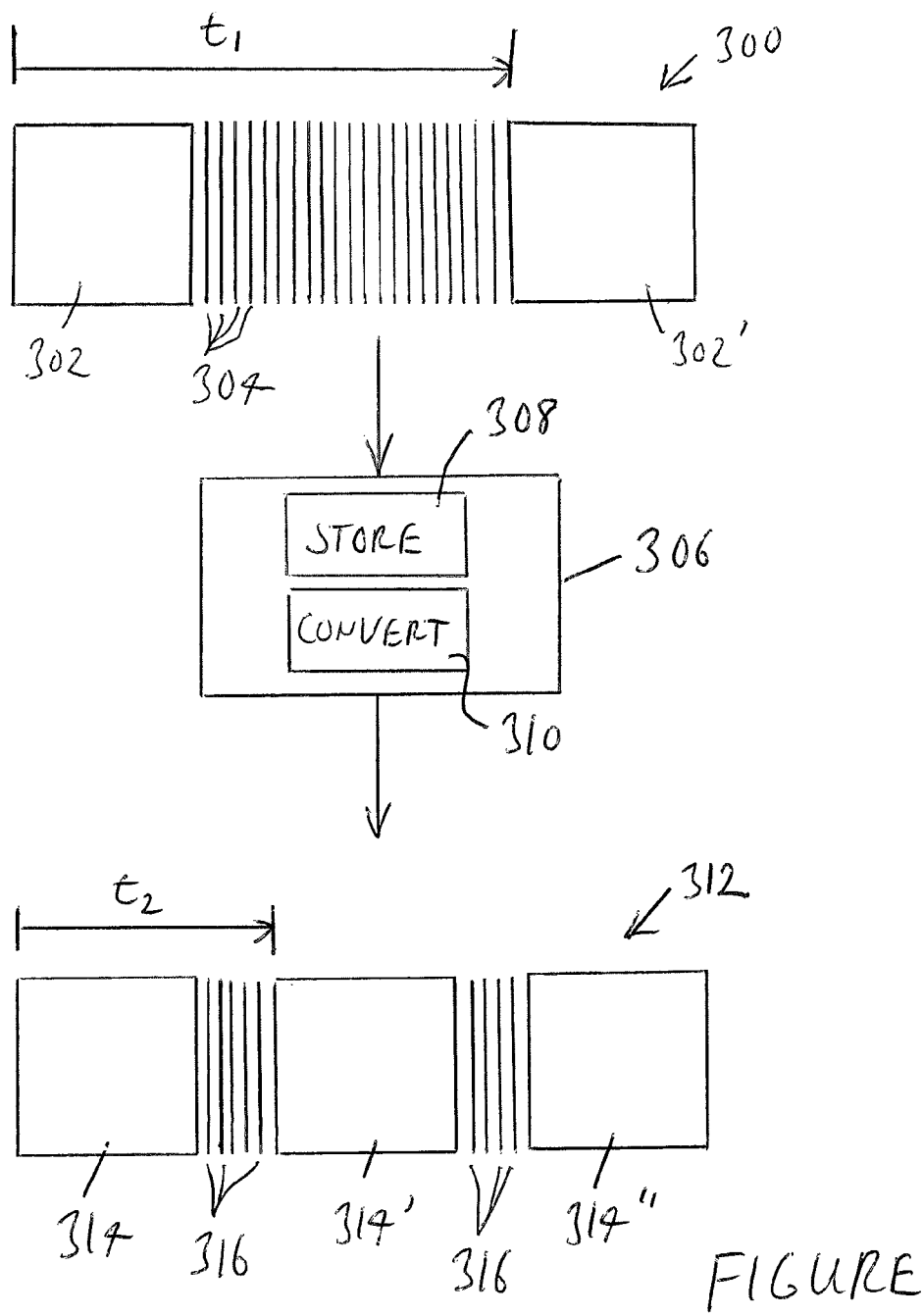
FIG. 4 is a schematic diagram of another part of the message storage device of FIG. 1 embodying an aspect of the present invention.

As illustrated in Figure 4. an example message 300 from an endpoint is in a compressed video format such as H.264 and it includes a plurality of image frames including key frames 302, 302' (or intra frames) and frames 304 between key frames (inter frames). The key frames include a representation of an image decodeable independently of other frames (either key frames 302, 302' or inter frames). In this example, the inter frames include so-called P-frames or predicted frames, which store the difference in image from either the intra frame or other P-frame immediately preceding it. In other words, the inter frames are decodeable dependent on other image frames. In this example, the key frames are at a first time interval of t1 apart. In a typical video network, the time t1 is variable and unpredictable. In a properly functioning video network, t1 could be the entire duration of the message. That is to say, there might only be a single key frame in a message. The processor 306 receives the video message 300 and stores it in a store 308. The converter or processor 310 then processes moving picture message stream into a processed moving picture message or video stream 312 that is output from the processor.

The movement of the messages between store and converter or processor 310 may be controlled as described above with reference to Figure 3. That is to say, movement of messages to and from the store and the processor depends on at least one predefined condition described above.

The output video stream is in the same format as the input stream, that is to say it includes key frames or intra frames 314, 314', 314" spaced apart by inter frames 316. However, the time interval (second time interval, t2) between the key frames of the output video stream is predefined. The time interval t2 is limited by at least one predefined constraint, for example, the storage requirement of the additional key frames and/or the desired speed at which a seek operation should be completed. The time interval may vary for the duration of the message within this constraint or constraints. The time interval t2 is typically less than the first time interval t1 between key frames of the input message stream (or the total duration of all the inter frames where there is only a single key frame in a message). The desired period t2 depends on the capabilities of the expected playback endpoint. For example, if an endpoint can decode video at twice real-time and it is desired that a user's seek operation take no more than 1 second, then the period t2 is selected at no more than 2 seconds. In other words, t2 is typically selected to be the desired minimum seek time multiplied by the multiples of real-time to decode video.

The processed or output moving picture message stream 312 is stored in the store 114 (see Figure 1) of the video/voicemail system.

The processor 306 includes an identifying mark in each key frame 314, 314', 314" of the processed moving picture message stream 312. Alternatively, the processor may include a generator (not shown) configured to generate a key frame index comprising an indication of the location of key frames in the processed moving picture message stream. Both these arrangements allow an endpoint to readily seek to a point in the video stream or video/voice mail message. These arrangements are described in more detail below.

Compressed video is represented as a stream of bits (1s and 0s). Computers usually store and manipulate data in bytes (groups of 8 bits). To enable efficient storage of compressed video, video compression systems align the bit stream to a byte boundary at the start of each frame. The bit stream at the start of the frame usually also contains a bit pattern (a sequence of 1s and 0s) which is selected never to be encountered within a frame. This combination of aligning the bit stream to a byte boundary and having the known bit pattern marker enables a video stream to be scanned quickly to identify where the frames start.

The header of each frame may be quickly read to identify whether the frame is a key frame or a difference frame.

Another way of storing the video bit stream is to keep it in a container format. That is, the bit stream for each frame is surrounded by other container data which is easily identifiable as a header by using markers. The container format stores data about the timestamp of the contained frame, and whether it is a key frame. Container formats allow audio and video data to be interleaved in the same file, and allow the timestamp and key frame data to be kept in a form which is independent of the particular video codec being used.

Another way of storing the media bit streams is to keep a separate index file which has a predictable fixed format. This index file is written at the same time that the video and audio data is written and it contains the offsets into the video and audio data files at known times (usually the start of each video key frame). This allows a seek operation to very quickly find the previous key frame for the time the user has requested.

The video/ voice mail system described herein may be implemented on a computer system including a single computer or on a plurality of computers on a network. The system may be implemented in software running on this computer or computers or the system may be implemented on this computer or computers wholly or in part using dedicated hardware of the computers.

Embodiments of the present invention have been described. It will be appreciated that variations and modifications may be made to the described embodiments within the scope of the present invention.

The invention claimed is:

1. A video/voice mail system, comprising:
   a message storage device configured to store video/voice messages; and
   an electronic device having predefined functionality, for at least one of transmitting a message to and receiving a message from the message storage device in a manner dependent on the predefined functionality of the electronic device, the electronic device further having a display;
   wherein the message storage device is configured to interact with the electronic device in a manner dependent on the predefined functionality of the electronic device; and
   wherein the display of the electronic device is configurable by the message storage device.

2. A video/voice mail system according to claim 1, wherein the message storage device stores messages comprising audio and video.

3. A video/voice mail system according to claim 1, wherein the message storage device interacts with a user's electronic device in a manner dependent on the user's electronic device comprising:
   a telephone for transmitting and receiving audio-only messages, or
   a videophone for transmitting and receiving audio and video messages.

4. A video/voice mail system according to claim 3, wherein the message storage device interacts with a user's electronic device such that only audio of a message stored as video and audio is transmitted to the telephone.

5. A video/voice mail system according to claim 1, wherein the message storage device interacts with a user's electronic device in a manner dependent on the display being a touch sensitive display.

6. A video/voice mail system according to claim 1, wherein the message storage device is configured to transmit to the user an indication that a message has been received.

7. A video/voice mail system according to claim 1, wherein the message storage device is configured to be controlled by a user.

8. A video/voice mail system according to claim 7, wherein the message storage device is configured to be controlled by a user using Far-End Camera Control (FECC) protocol.

9. A message storage device for storing video messages received at the message storage device electronically, the message storage device comprising:
 a store for storing encoded video messages;
 a processor for processing encoded video messages; and
 a controller configured to control movement of encoded video messages to and from the store and the processor depending on at least one predefined condition.

10. A message storage device according to claim 9, wherein the at least one predefined condition comprises processing load of the processor.

11. A message storage device according to claim 9, wherein the at least one predefined condition comprises spare storage capacity of the store.

12. A message storage device according to claim 9, wherein the at least one predefined condition comprises time.

13. A message storage device according to claim 9, wherein the at least one predefined condition comprises capability of a device used to transmit the encoded video messages to the message storage device.

14. A message storage device according to claim 9, wherein the at least one predefined condition comprises a size of an encoded video message.

15. A message storage device according to claim 9, wherein the at least one predefined condition is based on a feature of a recipient of an encoded video message.

16. A message storage device according to claim 9, wherein the feature comprises a location of the recipient of an encoded video message.

17. A message storage device according to claim 9, wherein the at least one predefined condition comprises an age of an encoded video message.

18. A message storage device according to claim 9, wherein the at least one predefined condition is based on a frequency at which a recipient of an encoded video message has previously accessed the encoded video message.

19. A message storage device according to claim 9, wherein the at least one predefined condition comprises at least one capability of at least one device expected to retrieve the encoded video messages from the message storage device.

20. A message storage device according to claim 9, wherein the processor is configured to encode video messages using at least one of a plurality of resolutions and a plurality of compression protocols.

21. A message storage device configured to store users' messages, the message storage device being configured to interact with a user's electronic device for at least one of transmitting a message to and receiving a message from the storage device in a manner dependent on the functionality of the user's electronic device; the message storage device is configured to be controlled by a user using Far-End Camera Control (FECC) protocol.

22. A message storage device forming part of a video/voice mail system, the message storage device being configured to interact with an electronic device having predefined functionality, for at least one of transmitting a video/voice message to and receiving a video/voice message from the message storage device in a manner dependent on the predefined functionality of the electronic device, the message storage device comprising:
 a store configured to store video/voice messages received from the electronic device;
 a processor configured to determine the predefined functionality of the electronic device; and
 a controller in communication with the store and the processor and configured to interact with the electronic device in a manner dependent on the predefined functionality of the electronic device; wherein the controller is adapted to configure a display of the electronic device.

23. A message storage device according to claim 22, wherein the message storage device stores messages comprising audio and video.

24. A message storage device according to claim 22, wherein the message storage device interacts with a user's electronic device in a manner dependent on the user's electronic device comprising:
 a telephone for transmitting and receiving audio-only messages, or
 a videophone for transmitting and receiving audio and video messages.

25. A message storage device according to claim 24, wherein the message storage device interacts with a user's electronic device such that only audio of a message stored as video and audio is transmitted to the telephone.

26. A message storage device according to claim 25, wherein the message storage device interacts with a user's electronic device in a manner dependent on the display being a touch sensitive display.

27. A message storage device according to claim 22, wherein the message storage device is configured to transmit to the user an indication that a message has been received.

28. A message storage device according to claim 22, wherein the message storage device is configured to be controlled by a user.

29. A message storage device according to claim 28, wherein the message storage device is configured to be controlled by a user using Far-End Camera Control (FECC) protocol.

* * * * *